L. Smith,
Splitting Wood.
No 359. Reissued Mar. 11, 1856.
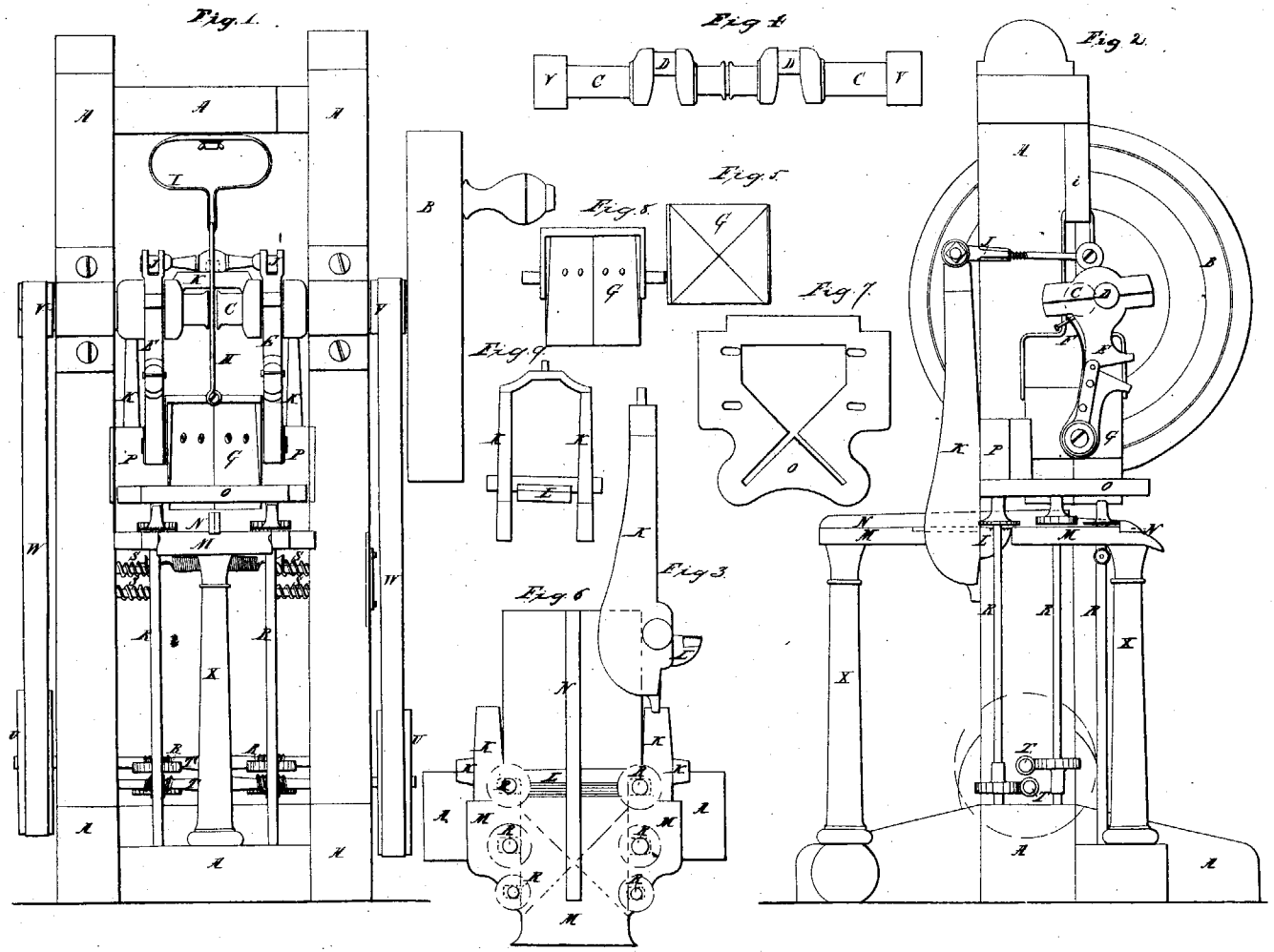
AM. PHOTO-LITHO. CO. N.Y. (OSBORNE'S PROCESS)

UNITED STATES PATENT OFFICE.

BENONA HOWARD, OF NEW YORK, N. Y., ASSIGNEE OF L. SMITH.

IMPROVEMENT IN MACHINES FOR SPLITTING OR CUTTING BLOCKS FOR THE PURPOSE OF MAKING MATCH-SPLINTS.

Specification forming part of Letters Patent No. 5,496, dated March 28, 1848; Reissue No. 359, dated March 11, 1856.

*To all whom it may concern:*

Be it known that LEWIS SMITH, of the city, county, and State of New York, late of Brandon, Rutland county, State of Vermont, did invent certain new and useful Improvements in Machinery for Splitting or Cutting Blocks of Wood for Match-Splints and other Purposes; and the following is hereby declared to be a full description of the same.

The nature of the invention consists in the combination of certain cranks, levers, cutters, and feeding apparatus for the purpose of cutting or splitting blocks of wood into match-splints, and for other purposes. To effect these operations two crank-centers are turned on the main driving-shaft, upon which are secured two levers to work the cutters. These levers are made with a joint in them, (though may be used without any joint in them,) and have stiffeners or springs at the back of the joints to throw them out of joint when the cutters have ceased to find any resistance in splitting the block. To the top of the cap-piece connecting the jointed levers to the cranks two arms are jointed, the opposite ends of which are similarly connected to a cross-bar, through the middle of which is a socket into which fits a pin on the cross-head of the crimping or compressing levers, for the purpose of working them by means of the cranks on the main shaft. The fulcrums of these levers work in boxes or caps attached to the upright side pieces of the frame. On the lower end of each lever is a crimper faced with steel. A girt of iron is bolted to the frame, the lower face of which projects about the thirty-second of an inch below the lower face of the adjustable cap or clearer plate, so as to oppose a broad and solid surface to the upper side of the block while being matted on its lower side by the action of the crimping or compressing levers. When the lower surface of the block has been crimped or matted, the adjustable cap or clearer plate and feed-wheels are pushed forward, so as to admit of the cutters making a new cut on entering the block again, the block being carried or fed forward between the intervals of crimping by means of suitable feed-gearing for that purpose; but to describe the invention more particularly reference will be had to the accompanying drawings.

Figure 1 is a back view of the machine. Fig. 2 is a side view, having one of the upright side pieces removed. Figs. 3 and 9 are views of the crimping or compressing lever. Fig. 4 is a detached view of the main shaft. Fig. 5 is a reversed view of the setting of the cutters. Figs. 6, 7, and 8 are representations of the lower and top feed-boards and cutting-box.

The letters of reference in the several drawings refer to like parts wherever they occur.

Letter A represents frame of the machine.

B and B is the driving-pulley on the main shaft C.

D D are crank-centers on the main shaft to work the crimping-lever K and levers E E, having their lowers ends attached to the cutter-holder frame or box G by a pin or screw.

Letter F represents two springs secured to back of the jointed levers E, for the purpose of throwing them out of joint when the cutters have passed through the block far enough to split it without cutting through the matted lower surface and upon the bed-plate.

It will be obvious that levers without joints in them can be used by shortening the length of the stroke of the cranks upon which they work to accomplish the same result; but as soft wood may be used generally and does not split freely at all times, it is desirable to have the knives to cut as near through, and yet not cut the bed-plate, as possible, and therefore I have preferred to use jointed levers, though others will answer.

Letter G is the cutting box or frame to which the four cutters or knives are attached. These knives are set or arranged in such a position as to intersect each other at their centers, so as to make a cross of the square and splitting the blocks with an inverted-V-shaped cut, so that at each feed of the machine the front knives cross the split made by the back knives at the angle of the split, which would be represented thus: 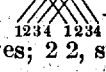

—that is, 1 1, first cut of the knives; 2 2, second cut; 3 3, third cut, &c.

Letter H is the steadying-hook attached to the cutting-box. This hook is intended to operate as a subsitute for guideways, to hold the knives in a vertical position while splitting the block.

Letter I is a steel loop attached to the crosspiece of the machine, and acting as a stiffener to steady the hook.

Letter J are two arms connected by a cross-bar at one end, and attached by means of joints to the heads of the levers E, so that when the machine is in motion the cranks D work them backward and forward, and by means of a pin or key-bolt on the head of the crimping-lever K, passing through the cross-bar connecting the outer ends of the arms J, the crimper L is worked upon its axis or centers of motion, which are secured in suitable boxes to the upright posts of the machine about on a line with the face of the bed M of the machine.

Letter L represents the face of the crimper, which is at right angles to the long arms of the crimping-levers K, and is adjusted upon its axis so as to work up between the open sides of a slot in the bed-board M of the machine, so as to compress or mat the surface of the block before being split and as it passes through the machine. The object of this matting process is to cause the blocks, when split for matches, to adhere together on their lower surfaces, and thereby avoid rehandling the splints in the process of dipping, packing, &c.

Letter M is the feed or bed board of the machine, having a slot transversely of it, so as to allow the crimper L to pass up through it to act upon the block of wood.

Letter N is a guide-strip upon the front end of the bed-board. Upon each side of this, from the front of the machine, the block or blocks of wood are placed and worked forward by hand till the feed-gear R R (or other equivalent feed-motion) takes hold of them and carries them forward to be acted upon by the cutters.

Letter O represents an adjustable cap or clearer plate having slots in it to allow the cutters to pass through, to act upon the wood and hold it from lifting or rising up to follow the knives when drawn back after making the cut; also, through the front edge of this adjustable cap or clearer plate is an angular opening, through which a portion of the girt-piece P extends about the thirty-second of an inch below the lower face of the cap-plate, and against which the upper surface of the block of wood presses during the operation of crimping or matting its lower surface. While the machine is in motion, cutting the blocks of wood, the adjustable cap or clearer plate is acting upon or holding the blocks down till the cut is made, after which it is drawn back to allow of the feed. When the adjustable cap or clearer plate has been drawn back, after the knives have done their work, the block or blocks are then fed up a sufficient distance for the knives to make a new cut.

Letters R represent several vertical shafts standing or resting upon steps on the lower cross-timbers of the frame. The upper ends of these shafts extend up through openings in the bed-board M and into oblong slots in the cap-plate O. The object of this is to adjust them to the varying widths of blocks to be cut, and of holding them firmly under the action of the cutters by means of spiral springs or other equivalent device pressing against them and the side pieces of the frame. On the lower ends of four of the vertical shafts are small pinion-wheels which gear into screw-threads cut upon the surface of two horizontal shafts, and on their upper ends are four ratchet feed-wheels, for the purpose of feeding the blocks into the machine. It will be obvious that this precise arrangement for feeding the blocks may be varied by the use of endless bands and other common and well-known devices, and therefore claim the privilege of using any equivalent feeding apparatus for the purposes set forth. The two back vertical shafts are not connected with the feeding-gear, and have only carrying rollers or buttons on their upper ends, and by means of a spiral spring connecting them together cause the carrying rollers or buttons to press at opposite sides against the splints as they come from under the knives, to prevent them from falling.

Letters S are four short arms adjusted and arranged between the uprights of the frame and the upper ends of the vertical feed-shafts, and by means of spiral springs on them act as self-regulating adjusters of the feed ratchet-wheels against the sides of the blocks, so as to accommodate their varying widths.

Letters T are two horizontal shafts having screw-threads cut upon them, and gearing into pinion-wheels on the lower ends of the vertical feed-shafts, and driven by means of a pulley on the end of each of the shafts and bands from the pulleys on the main shaft C.

Letters U are pulleys on the ends of the horizontal shafts, and V V pulleys on the main shaft C, for communicating motion to the feed-gear.

Letters W are bands connecting the main-shaft pulleys to the feed-gear pulleys, and X two posts to support the bed-board of the machine.

Having now described the invention and its operation, I will proceed to state what I claim and desire to secure by Letters Patent of the United States.

1. The use of the arrangement of the four cutters, arranged and operating substantially as hereinbefore set forth, in combination with the cutter frame or box, for the purposes hereinbefore described, and also the use of the cutters and cutter-frame, arranged and operating as hereinbefore described, in combination with an adjustable cap or clearer plate, for the purpose of holding the blocks of wood while under the action of the cutters, substantially as hereinbefore described.

2. The jointed levers or their equivalents, with or without springs at their backs, for the purposes hereinbefore set forth, and their combination with the cutters, and crank-motion or other equivalent device for working or operating a crimper for crimping or matting the surfaces of blocks of wood.

3. The use of the crimping or compressing levers or their equivalents, in combination with the bed-board M, for crimping or matting the lower surface of the blocks, substantially as hereinbefore described.

4. The use of the shafts R and ratchet feed-wheels or equivalents, for the purpose of feeding the blocks through the machine, in combination with the adjustable cap or clearer plate and bed-board, when used for the purpose of splitting blocks of wood.

BENONA HOWARD.

Witnesses:

W. F. HUNTER,

CHARLES L. BARRITT.